(12) United States Patent
Maekawa et al.

(10) Patent No.: US 11,874,396 B2
(45) Date of Patent: Jan. 16, 2024

(54) RADAR DEVICE

(71) Applicant: Murata Manufacturing Co., Ltd., Kyoto (JP)

(72) Inventors: Takuya Maekawa, Kyoto (JP); Nobuya Arakawa, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 277 days.

(21) Appl. No.: 17/361,610

(22) Filed: Jun. 29, 2021

(65) Prior Publication Data

US 2022/0026526 A1   Jan. 27, 2022

(30) Foreign Application Priority Data

Jul. 22, 2020   (JP) ................. 2020-125678

(51) Int. Cl.
*G01S 7/40* (2006.01)
*G01S 13/40* (2006.01)
*G01S 7/02* (2006.01)
*G01S 13/931* (2020.01)

(52) U.S. Cl.
CPC ............... *G01S 7/40* (2013.01); *G01S 7/028* (2021.05); *G01S 7/4017* (2013.01); *G01S 13/40* (2013.01); *G01S 13/931* (2013.01); *G01S 2013/93275* (2020.01)

(58) Field of Classification Search
None
See application file for complete search history.

(56) References Cited

U.S. PATENT DOCUMENTS

2017/0350970 A1   12/2017   Saito
2023/0131287 A1*   4/2023   Takayama ............... G01S 7/023
                                                                342/196

FOREIGN PATENT DOCUMENTS

JP   H10-282229 A   10/1998
JP   2017-215236 A   12/2017

* cited by examiner

*Primary Examiner* — Whitney Moore
(74) *Attorney, Agent, or Firm* — Pearne & Gordon LLP

(57) ABSTRACT

A radar device includes a transmit antenna radiating a modulation signal and a receive antenna receiving reflection waves from the modulation signal. The radar device also includes a mixer mixing the modulation signal and the received signal to output a beat signal, a calculation circuit judging presence or absence of an abnormality by using the beat signal, and a memory storing reference data and a threshold. The reference data indicates a phase component of a set frequency signal from a beat signal without necessarily any abnormality. The set frequency signal is generated from the modulation signal reflected on a surface of a housing located at a set distance from the radar device. The calculation circuit extracts a phase component from the beat signal and supplies information indicating the presence of an abnormality if the difference between the extracted phase component and the reference data is greater than the threshold.

10 Claims, 11 Drawing Sheets

RADAR DEVICE

CROSS REFERENCE TO RELATED APPLICATION

This application claims priority from Japanese Patent Application No. 2020-125678 filed on Jul. 22, 2020. The content of this application is incorporated herein by reference in its entirety.

BACKGROUND

The present disclosure relates to a radar device.

Japanese Unexamined Patent Application Publication No. 2017-215236 discloses a radar device that is installed in a vehicle to detect an abnormality of the bumper of the vehicle. In this radar device, a transmission processor is disposed on the inner side of the bumper and radiates a wave. Part of this transmitted wave is reflected on the inner side of the bumper and the remaining part of the transmitted wave is radiated to the outside of the bumper. The transmitted wave reflected on the inner side of the bumper returns to the radar device as a bumper reflected wave. The transmitted wave radiated to the outside of the bumper is reflected by a target near the vehicle and returns to the radar device as a target reflected wave. A receiving processor of the radar device receives the target reflected wave, the bumper reflected wave, and a transmit-receive leakage occurred due to the influence of the transmitted wave inside the radar device. A target is detected by using the target reflected wave.

A bumper abnormality judger of this radar device detects the level of received waves including the bumper reflected wave and the transmit-receive leakage and compares the level of the received waves with a threshold. If the level of the received waves is greater than the threshold, the bumper abnormality judger judges that an abnormality has occurred in the bumper. The threshold is preset based on the received level of a transmit-receive leakage measured in advance.

BRIEF SUMMARY

A housing enclosing a radar device is called a radar dome and also contains a bumper. An abnormality in the radar dome may affect the measurement accuracy of the radar device. It is thus desirable to provide a radar device that can detect abnormalities including those in a radar dome.

The present disclosure provides a radar device that is able to detect abnormalities including those in a radar dome, which may influence the measurement accuracy of the radar device.

According to an embodiment of the present disclosure, there is provided a radar device that is able to detect an abnormality. The radar device includes a transmitter, a transmit antenna, a receive antenna, a mixer, a calculation circuit, and a memory. The transmitter generates a modulation signal. The transmit antenna radiates the modulation signal. The receive antenna receives as a received signal a signal indicating reflection waves generated by reflection of the modulation signal. The mixer is connected to the transmit antenna and the receive antenna and mixes the modulation signal and the received signal so as to output a beat signal. The calculation circuit executes judging processing for judging presence or absence of an abnormality by using the beat signal. The memory stores reference data and a threshold. The reference data and the threshold are used in the judging processing. The reference data indicates a phase component of a set frequency signal. The phase component is extracted from a beat signal which is output from the mixer when there is no abnormality concerning the radar device. The set frequency signal is a signal generated as a result of the modulation signal radiated from the transmit antenna being reflected on a surface of a housing. The housing stores the radar device therein and the surface of the housing is located at a set distance from the radar device. The calculation circuit executes as the judging processing: processing for reading the reference data and the threshold from the memory; processing for obtaining the beat signal from the mixer; processing for extracting a phase component of the set frequency signal from the beat signal; and processing for supplying information indicating the presence of an abnormality if a difference between the extracted phase component and the reference data is greater than the threshold.

In an embodiment, the beat signal may indicate frequency components. Each of the frequency components is determined by a distance by which the modulation signal radiated from the transmit antenna returns to the receive antenna via a corresponding one of plural reflection points of the modulation signal. The plural reflection points include a point at which the modulation signal is reflected inside the housing and a point at which the modulation signal is reflected outside the housing. There may be plural paths inside the housing. Each of the plural paths is a path through which the modulation signal radiated from the transmit antenna returns to the receive antenna. The set frequency signal may indicate a frequency component corresponding to the distance of a path selected from the plural paths.

In an embodiment, the reference data may indicate a phase component of the set frequency signal, the phase component having an amplitude value. As the processing for extracting a phase component, the calculation circuit may extract a phase component of the set frequency signal from the beat signal, the phase component having an amplitude value. When the difference between the extracted phase component and the reference data is represented by a phase component having an amplitude value, as the processing for supplying information indicating the presence of an abnormality, the calculation circuit may supply the information if the amplitude value is greater than the threshold.

In an embodiment, as the processing for extracting a phase component, the calculation circuit may extract a phase component of the lowest frequency component selected from the frequency components corresponding to the plural paths. The lowest frequency component may correspond to the shortest path of the plural paths.

In an embodiment, as the processing for extracting a phase component, the calculation circuit may extract plural phase components each having an amplitude value from the beat signal. Each of the plural phase components corresponds to a frequency component determined by a corresponding one of the plural paths. The calculation circuit may select the phase component having the largest amplitude value from the plural extracted phase components. When the difference between the selected phase component and the reference data is represented by an amplitude value and a phase, as the processing for supplying information indicating the presence of an abnormality, the calculation circuit may supply the information if the largest amplitude value of the selected phase component is greater than the threshold.

In an embodiment, as the processing for obtaining the beat signal, the calculation circuit may obtain a beat signal which is a continuous time signal. As the processing for extracting a phase component, the calculation circuit may perform sampling processing and quantizing processing on the beat signal so as to generate a discrete time beat signal, perform discrete Fourier transform processing on the discrete time beat signal so as to transform the discrete time beat signal into frequency domain data, and extract a phase component of the set frequency signal from the frequency domain data, the phase component having an amplitude value.

In an embodiment, the difference between the extracted phase component and the reference data may be represented by an amplitude value and a phase in a complex domain. As the processing for supplying information indicating the presence of an abnormality, the calculation circuit may supply the information if the amplitude value of a real part in the complex domain is greater than the threshold.

In an embodiment, the modulation signal may be one of a chirp signal and a modulated pulse signal.

In an embodiment, the housing may include at least a radar dome. The surface of the housing may be an inner surface or an outer surface of the radar dome.

In an embodiment, the memory may also store correction data. The correction data is data for correcting a change in a phase component of the set frequency signal caused by a temperature of the radar device. The phase component is extracted from a beat signal obtained when the radar device has a housing for storing the transmit antenna and the receive antenna. The calculation circuit may execute: processing for obtaining temperature data indicating a temperature when the beat signal is obtained; after extracting the phase component, processing for correcting the phase component by using the correction data, based on the temperature data; and processing for supplying information indicating the presence of an abnormality if a difference between the corrected phase component and the reference data is greater than the threshold.

In an embodiment, the calculation circuit may judge whether a level of the corrected phase component obtained by subtracting a phase amount indicated by the correction data from the extracted phase component exceeds a predetermined reflection level. If the level of the corrected phase component does not exceed the predetermined reflection level, the calculation circuit may perform measurement of a target.

According to embodiments of the present disclosure, it is possible to provide a radar device that is able to detect abnormalities including those in a radar dome.

Other features, elements, characteristics and advantages of the present disclosure will become more apparent from the following detailed description of embodiments of the present disclosure with reference to the attached drawings.

DETAILED DESCRIPTION

A description will first be given of the background where the present inventors have conceived a radar device according to an embodiment of the disclosure. The present inventors have made a study of the radar device disclosed in Japanese Unexamined Patent Application Publication No. 2017-215236 and has found an issue to be addressed.

Figure 1:
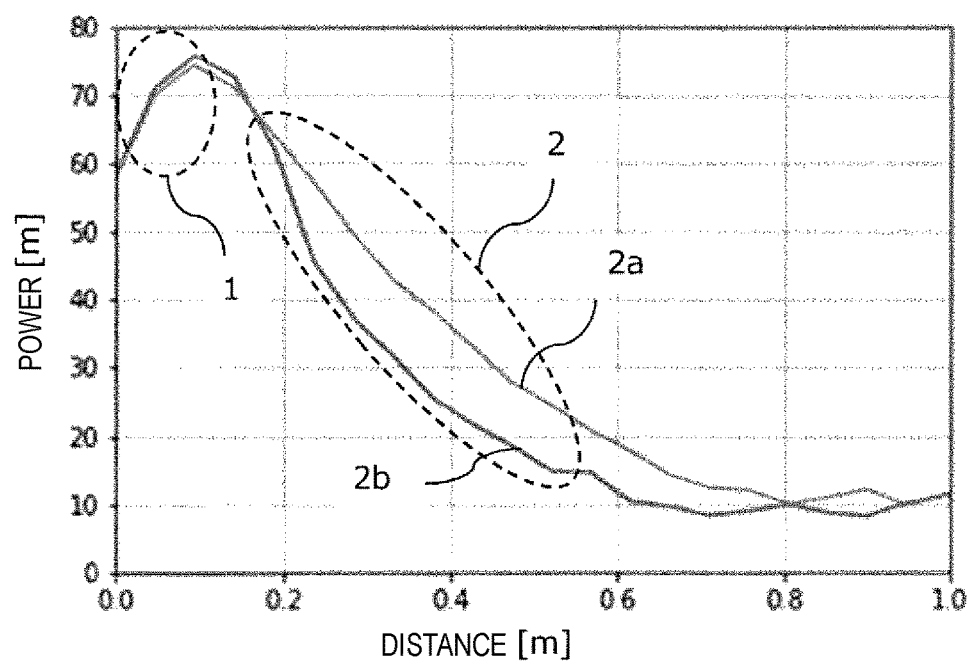
FIG. 1 is a waveform diagram of a reflected wave detected by a known radar device when an abnormality is attached to the vicinity of the radar device and that when an abnormality is not attached thereto.

FIG. 1 illustrates waveforms of reflected waves detected by the radar device disclosed in the above-described publication. The present inventors have simulated an abnormality by attaching wet paper to a bumper disposed near the radar device. A waveform 2a indicates the detection result obtained by the radar device when wet paper is attached to the bumper. A waveform 2b indicates the detection result obtained by the radar device when wet paper is not attached to the bumper.

A distance of about 0.05 m or smaller from the radar device will be called a short distance, and a distance of about 0.2 to 0.8 m from the radar device will be called a medium distance. For example, if the radar device is installed in the bumper of a vehicle, the distance from the radar device to the bumper is a short distance, and the distance from the radar device to a person standing near the vehicle is a medium distance. In FIG. 1, a distance range 1 corresponding to the short distance and a distance range 2 corresponding to the medium distance are shown.

The radar device disclosed in the above-described publication detects an abnormality by comparing the level of a reflected wave from the bumper located at a short distance from the radar device with a predetermined threshold. If the level of the reflected wave is smaller than or equal to the threshold, it is determined that no abnormality is detected. When power of the waveform 2a and that of the waveform 2b are not significantly different, as indicated by the distance range 1 in FIG. 1, it is determined that no abnormality is detected. In contrast, a relatively large difference is observed between power of the waveform 2a and that of the waveform 2b in the distance range 2 according to whether a substance, wet paper in this case, is attached to the bumper. The radar device disclosed in the above-described publication is dedicated to detecting an abnormality on the bumper, which is located at a short distance from the radar device. However, it is difficult for this radar device to find an abnormality, such as a substance attached to the bumper, which may influence the medium-distance measurement accuracy of the radar device.

The present inventors have examined the configuration of a radar device that does not lower the detection accuracy for a target located at a medium distance from the radar device. As a result, the present inventors have attained a radar device that can detect an abnormality, such as a substance attached to a bumper or a scratch on a bumper, which does not significantly affect short-distance detection accuracy but may influence the level of a reflected wave from a medium-distance target. That is, a radar device that can maintain high level of detection accuracy even for medium-distance targets is implemented.

An embodiment of the disclosure will be described below in detail with reference to the accompanying drawings. However, an excessively detailed explanation of the embodiment may be omitted to avoid redundancy and to facilitate the understanding of the disclosure for those skilled in the art. For example, a detailed explanation of items which are already well known and a repeated description of elements having substantially the same configuration may be omitted. The following description and accompanying drawings provided by the present disclosures are intended to facilitate the understanding for those skilled in the art and are not to be exhaustive or to limit the disclosure to the precise forms disclosed.

The configuration and operation of the following embodiment are only an example and the disclosure is not restricted thereto. The drawings are only schematically illustrated and are not necessarily illustrated precisely. In the drawings, substantially the same elements are designated by like reference numeral, and an explanation of such elements will not be repeated or be merely simplified.

Figure 2:
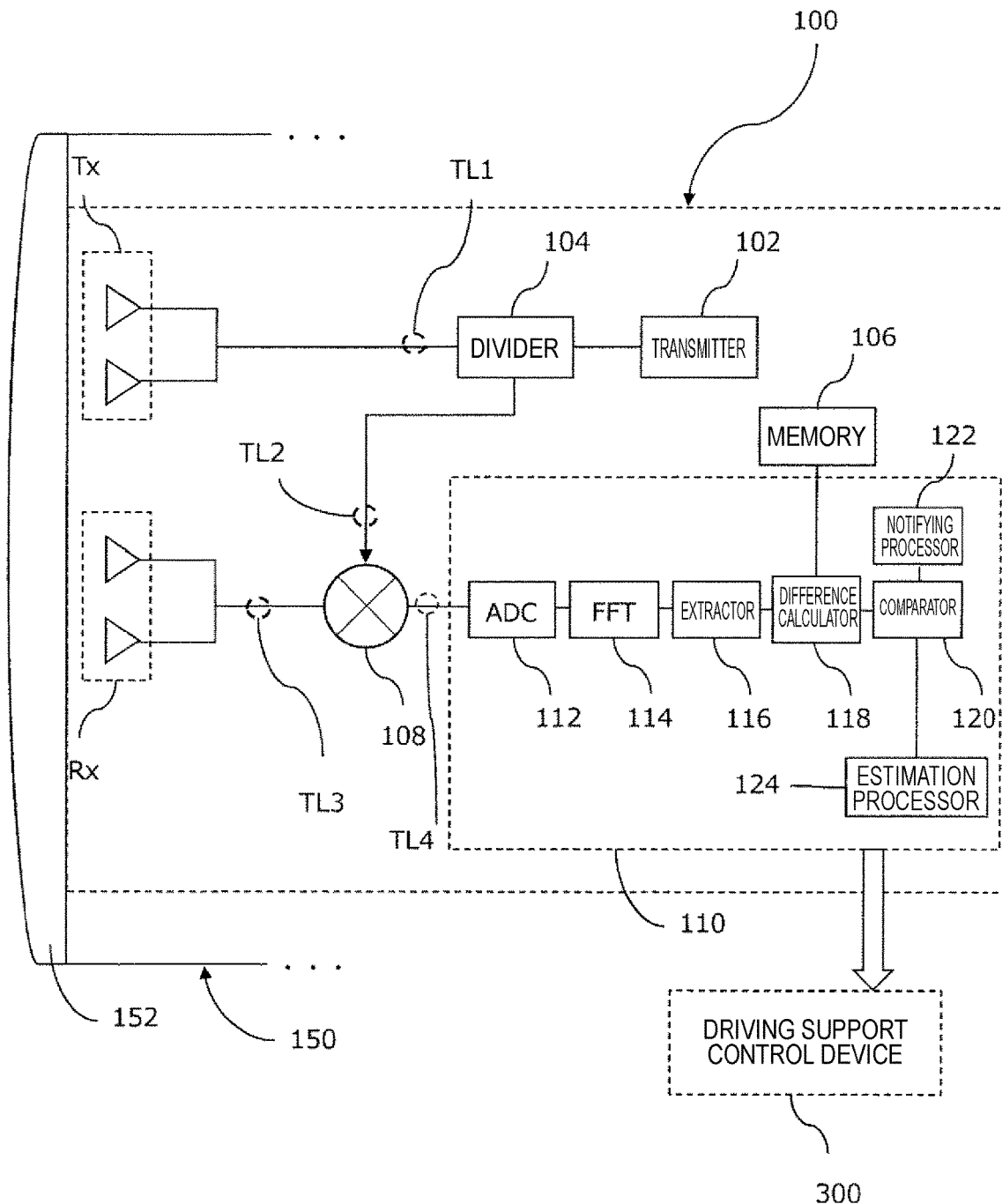
FIG. 2 is a block diagram illustrating the hardware configuration of a radar device according to an embodiment.

FIG. 2 is a block diagram illustrating the hardware configuration of a radar device 100 according to the embodiment. The radar device 100 is installed in a vehicle (hereinafter may be called the subject vehicle) and calculates the distance to a target, such as a leading vehicle ahead of the subject vehicle, the relative velocity between the subject vehicle and the target, and the angle of the target. A driving support control device 300 is also shown in FIG. 2. The driving support control device 300 receives information about the distance to the target and the relative velocity and the angle of the target calculated by the radar device 100 and performs control to support the driving of the vehicle. The control operation for supporting the driving of the vehicle is not encompassed in the disclosure, and a description of the specific configuration and operation of the driving support control device 300 will thus be omitted. The configuration and processing of the radar device 100 will be described below. The traveling direction of the subject vehicle is a direction from the right side to the left side in FIG. 2.

The radar device 100 includes a transmitter 102, a divider 104, a transmit antenna Tx, a receive antenna Rx, a memory 106, a mixer 108, and a calculation circuit 110. As transmission lines for a signal, the radar device 100 has transmission lines TL1, TL2, TL3, and TL4. The radar device 100 is stored in a housing 150 and the housing 150 is installed in a front grille, for example, of the vehicle. For the sake of description, the housing 150 is not entirely shown. A radar dome 152, which forms part of the housing 150, is shown in FIG. 2.

The transmitter 102 generates a modulation signal. An example of the modulation signal is a chirp signal. In this specification, a description will be given, assuming that the modulation signal is a chirp signal. Another example of the modulation signal is a pulse signal generated by modulating a pulse width using pulse width modulation (PWM).

The divider 104 receives at an input terminal a chirp signal output from the transmitter 102 and divides the received chirp signal into two signals and outputs them to two output terminals. The two output terminals of the divider 104 are connected to the transmission lines TL1 and TL2. Due to a loss incurred by dividing the chirp signal, the amplitudes of the divided two chirp signals become lower than that of the chirp signal input into the divider 104. Nevertheless, the divider 104 does not change the phase of the input chirp signal. The chirp signals output to the transmission lines TL1 and TL2 are in phase with that input into the divider 104. The divider 104 may be integrated into the transmitter 102. In this case, the transmission lines TL1 and TL2 are connected to the transmitter 102, and the transmitter 102 outputs divided chirp signals to the transmission lines TL1 and TL2.

The transmit antenna Tx is disposed at an end portion of the transmission line TL1. When a chirp signal propagating through the transmission line TL1 has reached the transmit antenna Tx, the transmit antenna Tx radiates the chirp signal in the traveling direction of the vehicle. The chirp signal is reflected on the surface of one or more targets outside the radar device 100 in various directions and part of reflected waves returns toward the radar device 100. The receive antenna Rx of the radar device 100 receives a signal indicating the reflected waves. The transmission line TL3 is connected to the receive antenna Rx. The receive antenna Rx outputs the received signal indicating the reflected waves to the transmission line TL3.

An end portion of the transmission line TL2 and an end portion of the transmission line TL3 are connected to the mixer 108. The mixer 108 receives the chirp signal having propagated through the transmission line TL2 and the received signal having propagated through the transmission line TL3. The mixer 108 then mixes the chirp signal and the received signal to generate and output an intermediate frequency signal (beat signal).

The memory 106 stores a computer program to be executed by the calculation circuit 110. In this specification, the memory 106 includes a random access memory (RAM) and a read only memory (ROM). As a result of reading the computer program from the ROM and loading it into the RAM, the calculation circuit 110 can execute the computer program to operate the radar device 100. The memory 106 also stores data required for the calculation circuit 110 to execute processing. More specifically, the memory 106 stores reference data and a threshold.

The calculation circuit 110 is a semiconductor integrated circuit (IC) called a central processing unit (CPU). The calculation circuit 110 reads the computer program for operating the radar device 100 from the memory 106 and executes the read program.

Upon receiving output (beat signal) from the mixer 108, the calculation circuit 110 executes judging processing to check for an abnormality for the use of the radar device 100, based on the reference data and the threshold stored in the memory 106. Details of judging processing will be discussed later. If an abnormality is not detected as a result of executing judging processing, the calculation circuit 110 executes estimation processing for a target, that is, processing for estimating the distance to a target, relative velocity between the subject vehicle and the target, and the angle of the target, by using the beat signal.

Figure 3A:
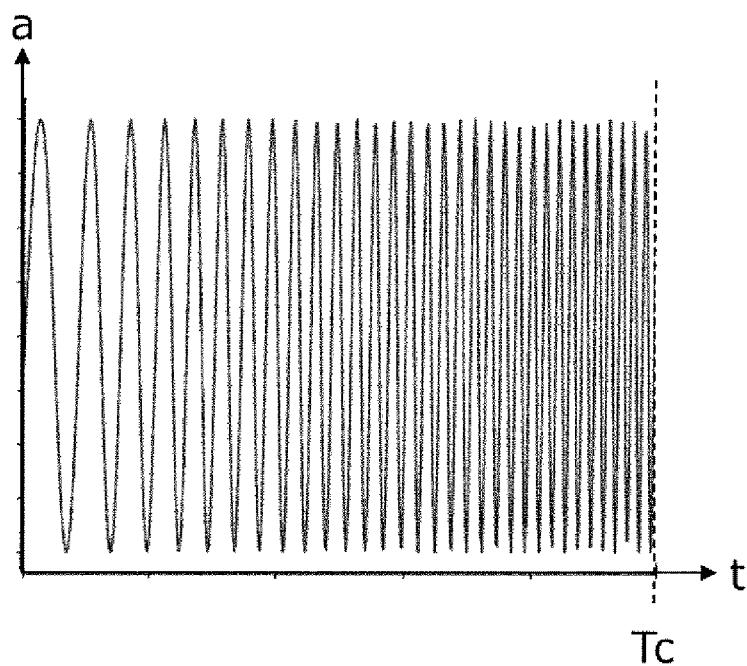
FIG. 3A is a waveform diagram illustrating the relationship of the amplitude (a) of a chirp signal to the time (t)
Figure 3B:
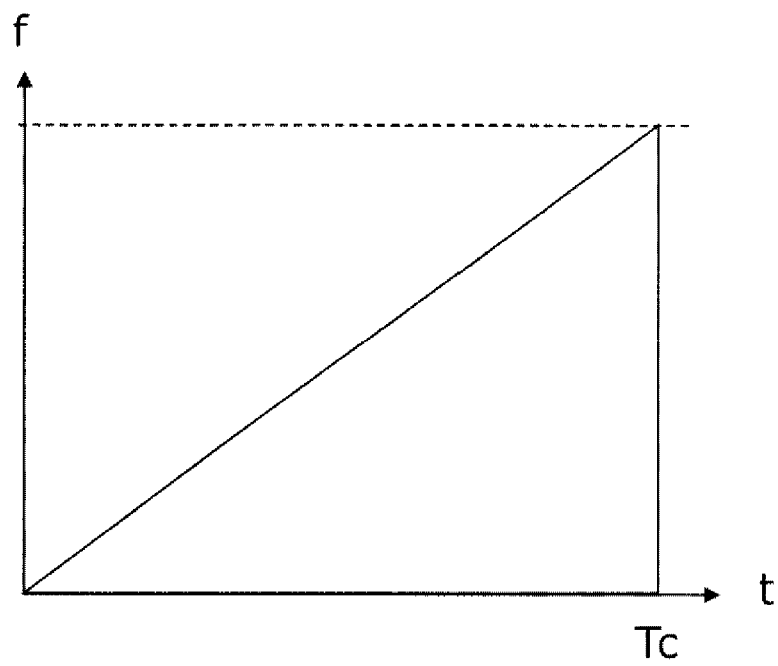
FIG. 3B is a waveform diagram illustrating the relationship of the frequency (f) of a chirp signal to the time (t)

FIGS. 3A and 3B illustrate examples of waveforms of a chirp signal generated in the transmitter 2 and sent from the transmit antenna Tx. FIG. 3A is a waveform diagram illustrating the relationship of the amplitude (a) of the chirp signal to the time (t). FIG. 3B is a waveform diagram illustrating the relationship of the frequency (f) of the chirp signal to the time (t). As shown in FIGS. 3A and 3B, the chirp signal used in the embodiment is a sign wave which linearly increases during the continuous time Tc. In one example, the lowest frequency of the chirp signal shown in FIG. 3B is 76 GHz, and the highest frequency is 81 GHz. As the chirp signal, a sine wave which linearly decreases during the continuous time Tc may be used, instead.

Figure 4A:
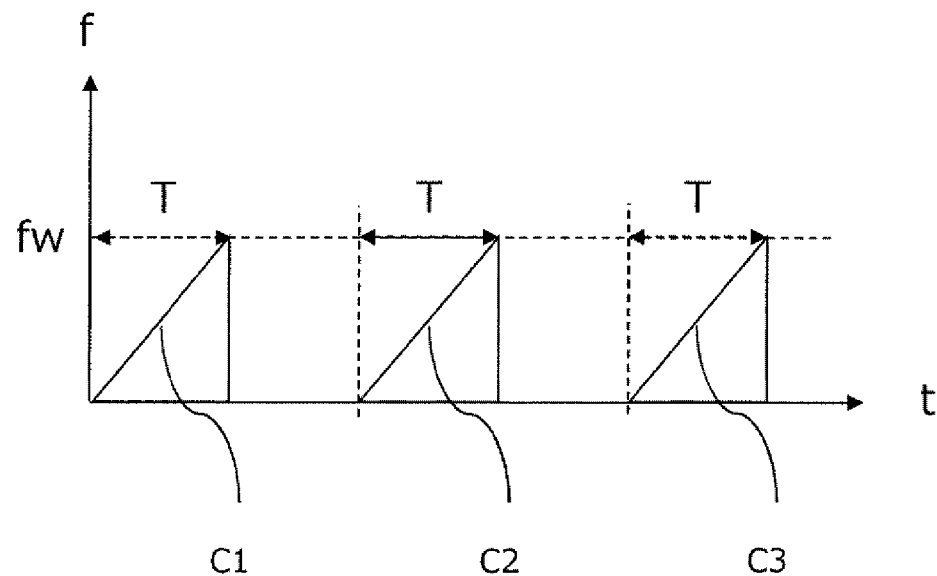
FIG. 4A is a waveform diagram illustrating an example of a time-frequency waveform of three continuous chirp signals C1, C2, and C3 transmitted from the radar device.
Figure 4B:
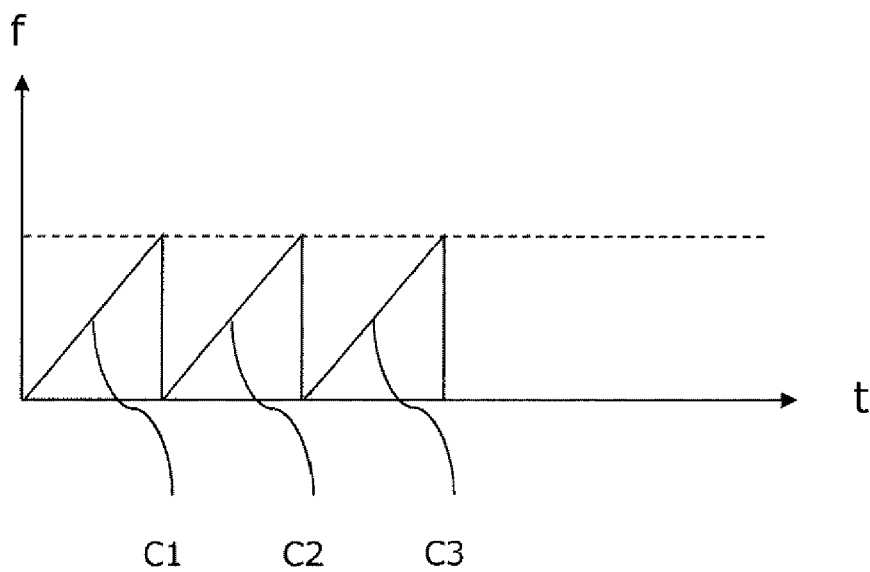
FIG. 4B is a waveform diagram illustrating another example of a time-frequency waveform of three continuous chirp signals C1, C2, and C3 transmitted from the radar device.

Based on the chirp signal shown in FIGS. 3A and 3B as a unit, the radar device 100 sends multiple chirp signals. FIGS. 4A and 4B illustrate the time-frequency waveforms of three continuous chirp signals C1, C2, and C3 sent from the radar device 100. The frequency sweep width (the amount of increase) of each chirp signal is represented by $f_w$, and the transmission time length for each chirp signal is represented by T. In the example in FIG. 4A, there are time intervals between the chirp signals. In the example in FIG. 4B, there is no time intervals between the chirp signals. A radar device using the chirp signal in FIG. 4A or 4B may be called a frequency modulated continuous wave (FMCW) radar device.

Referring back to FIG. 2, processing for detecting an abnormality by the radar device 100 according to the embodiment is executed in the following manner.

The transmitter 102 generates a modulation signal, such as a chirp signal, and the transmit antenna Tx radiates the modulation signal. The receive antenna Rx receives a signal indicating reflected waves generated from the modulation signal. The mixer 108, which is connected to the transmit antenna Tx and the receive antenna Rx, mixes the modulation signal and the received signal to generate and output a beat signal. The calculation circuit 110 executes judging processing for checking for an abnormality by using the beat signal.

To execute judging processing, the calculation circuit 110 utilizes the reference data and the threshold stored in the memory 106. The reference data indicates a phase component of a signal having a set frequency, and more specifically, the phase component extracted from a beat signal which is obtained when there is no abnormality concerning the radar device 100. The set frequency is a frequency corresponding to a set distance from the transmit antenna Tx to the vicinity of the front surface of the housing 150 integrating the radar device 100. More specifically, if the radar dome 152 is assumed as the housing 150, the vicinity of the front surface of the housing 150 is the inner surface or the outer surface of the radar dome 152. The threshold is a basis for judging the magnitude of the difference between the reference data and the phase component of a signal having a set frequency extracted from a beat signal. In the specification, the signal having a set frequency may also be called a set frequency signal.

As judging processing, the calculation circuit 110 executes processing for reading the reference data and the threshold from the memory 106, processing for obtaining a beat signal from the mixer 108, processing for extracting the phase component of the above-described set frequency signal from the beat signal, and processing for supplying information indicating the presence of an abnormality if the difference between the extracted phase component and the reference data is greater than the threshold.

Judging processing executed by the radar device 100 will be explained more specifically.

Figure 5:
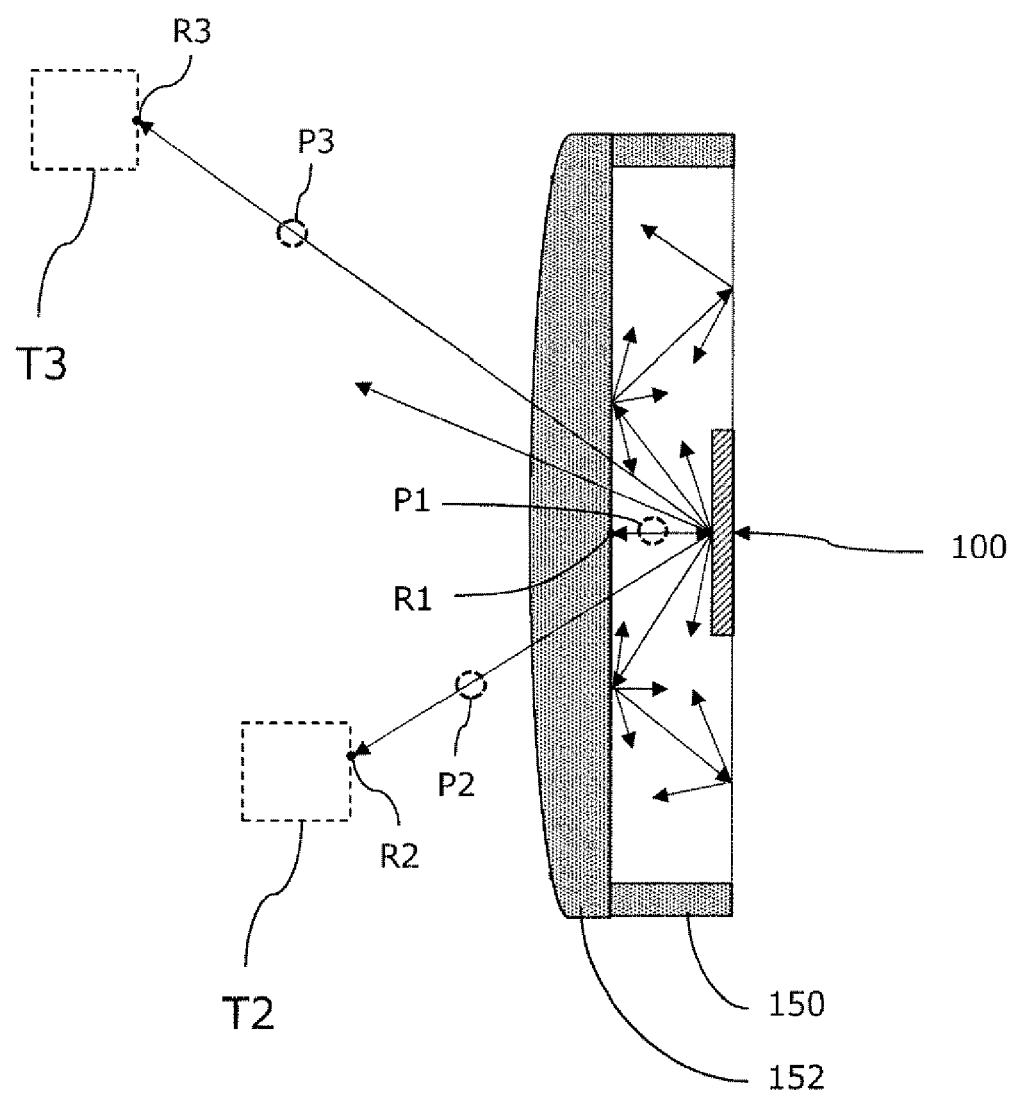
FIG. 5 schematically illustrates that part of a transmitted wave is being reflected on the inner side of a radar dome in various directions and another part of the transmitted wave is being radiated to the outside of the radar dome.

FIG. 5 schematically illustrates that part of a transmitted wave radiated from the transmit antenna Tx of the radar device 100 is being reflected on the inner side of the radar dome 152 in various directions and another part of the transmitted wave is being radiated to the outside of the radar dome 152. The transmitted wave is reflected on the inner side of the radar dome 152 one or multiple times. After the transmitted wave is reflected one or multiple times, it is propagated to the outside of the radar dome 152 or is input into the receive antenna Rx without necessarily being output to the outside of the radar dome 152. The transmitted wave radiated to the outside of the radar dome 152 reaches a target and is reflected by the surface of the target. The resulting reflected wave partially returns to the radar device 100.

The receive antenna Rx continuously receives a signal indicating waves reflected on the inner side of the radar dome 152 and waves reflected by a target for a set time. The reflected waves originate from the single transmitted wave radiated from the transmit antenna Tx at a certain time. However, reflected waves propagate through various paths before being received by the receive antenna Rx, and the propagation distances of the reflected waves are thus different from each other. As a result, the times at which the reflected waves reach the receive antenna Rx are also different.

Three different propagation paths P1, P2, and P3 of the transmitted wave are shown in FIG. 5 as an example.

The propagation path P1 is a round path from the transmit antenna Tx of the radar device 100 to the receive antenna Rx via a reflection point R1 on the inner side of the radar dome 152. The propagation path P2 is a round path from the transmit antenna Tx to the receive antenna Rx via a reflection point R2 on the surface of a target T2 outside the radar device 100. The propagation path P3 is a round path from the transmit antenna Tx to the receive antenna Rx via a reflection point R3 on the surface of a target T3 outside the radar device 100. For the sake of description, the relationship between the lengths of the propagation paths P1, P2, and P3 is represented by P1<P2<P3.

FIG. 5 shows that the transmitted wave is reflected in a space of the housing 150 and on the targets T2 and T3. However, the transmitted wave may also be reflected inside the radar dome 152. The inside of the radar dome 152 is a portion made of a resin material, for example, between the inner surface of the housing 150 and the outer surface of the housing 150. Hence, the front surface of the housing 150 also includes the outer surface of the radar dome 152.

Figure 6A:
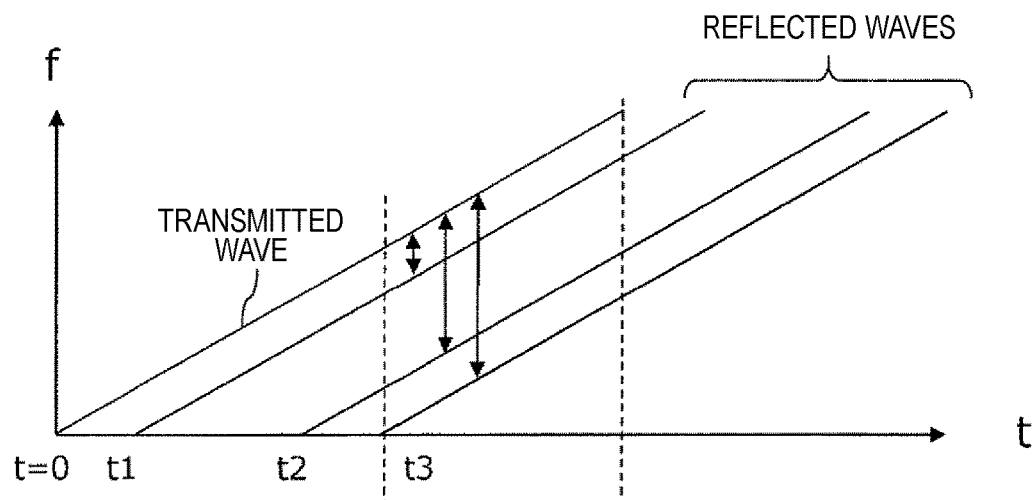
FIGS. 6A and 6B are graphs for explaining the relationship between a wave transmitted from a transmit antenna Tx and reflected waves received by a receive antenna Rx.
Figure 6B:
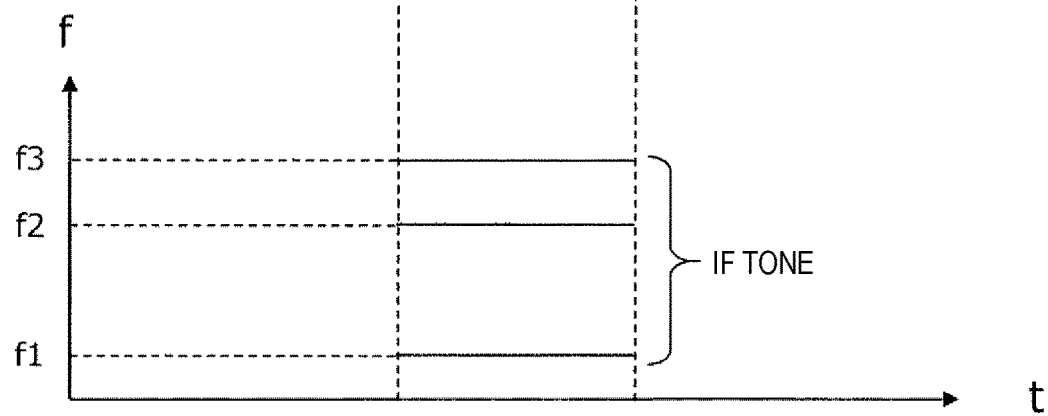

FIGS. 6A and 6B are graphs for explaining the relationship between a wave transmitted from the transmit antenna Tx and reflected waves received by the receive antenna Rx. FIG. 6A illustrates the relationship between time t at which the wave is transmitted from the transmit antenna Tx and time t at which a specific reflected wave is received. The time t at which the wave is transmitted from the transmit antenna Tx is 0. The times t at which the reflected waves propagating through the propagation paths P1, P2, and P3 have reached the receive antenna Rx are indicated by t1, t2, and t3, respectively. The reflected wave having a shorter propagation distance reaches the receive antenna Rx earlier. The relationship between the times at which the reflected waves reach the receive antenna Rx is thus indicated by t1<t2<t3.

FIG. 6B illustrates a certain tone of frequencies corresponding to the reflected waves shown in FIG. 6A among the various frequencies included in the beat signal generated from the transmitted wave and the reflected waves. The time waveform of the beat signal is determined by subtracting the time waveform of the received wave from that of the transmitted wave. In the frequency of the beat signal, a frequency tone representing the frequency differences f1, f2, and f3 between the transmitted wave and the reflected waves received at times t1, t2, and t3 is observed.

The frequency of the beat signal (beat frequency) is expressed by the following equation (1):

$$f_B = 2Rf_w/(cT) \quad (1)$$

where $f_B$ is the beat frequency, R is the distance from the transmit antenna Tx to a reflection point, c is the speed of light, $f_w$ is the frequency sweep width (the amount of increase), and T is the transmission time length of the transmitted wave.

Since the speed of light c, the frequency sweep width $f_w$, and the transmission time length T are constant, the beat frequency is proportional to the propagation distance (2·R) of each reflected wave from the transmit antenna Tx to the received antenna Rx via the reflection point. It can be said that the frequency of a beat signal is varied in accordance with the distance from the radar device 100 to a reflection point.

Judging processing executed by the calculation circuit 110 is processing for determining the presence or absence of an abnormality by using the above-described beat signal.

In the embodiment, the calculation circuit 110 first executes processing for extracting the phase component of a set frequency signal from the beat signal. The set frequency signal is a signal radiated from the transmit antenna Tx and reflected by the surface (inner surface, for example) of the housing 150 storing the radar device 100, which is located at a set distance from the transmit antenna Tx. That is, the set frequency signal has a frequency determined by this distance. For example, in FIG. 5, the reflection point R1 is a point forming the inner surface of the radar dome 152, and the distance from the transmit antenna Rx to this point is equal to the single propagation path P1. In FIG. 5, only the single paths of the propagation paths P1, P2, and P3 are shown and the return paths are not shown. The following description will be given, assuming that the reflection point R1 on the inner surface of the radar dome 152 is the closest point from the radar device 100. In other words, the distance of the round propagation path P1 is the shortest propagation length for the wave radiated from the transmit antenna Tx.

Referring back to FIG. 2, the elements of the calculation circuit 110 and operations thereof will be discussed below. The calculation circuit 110 includes an analog-to-digital converter (ADC) 112, a fast Fourier transform (FFT) 114, an extractor 116, a difference calculator 118, a comparator 120, a notifying processor 122, and an estimation processor 124.

A beat signal output from the mixer 108 is an analog continuous time signal. The beat signal is represented by b(t), for example, as a time function. The calculation circuit 110, which is a semiconductor IC, converts the beat signal b(t) into a format suitable for digital signal processing. That is, the calculation circuit 110 performs sampling processing and quantizing processing on the beat signal b(t) by using the ADC 112 so as to generate a discrete time beat signal. In sampling processing, the calculation circuit 110 samples some items of the beat signal b(t) with a sampling frequency fs. In quantizing processing, the calculation circuit 110 quantizes the sampled data with the number P of quantization bits. The number of samples is indicated by N. The discrete time beat signal output from the ADC 112 is represented by $x_n$ (n is an integer of 0, ..., N−1). Each $x_n$ has a digital value expressed by the number P of quantization bits. The provision of the ADC 112 in the calculation circuit 110 is optional. The ADC 112 may be disposed outside the calculation circuit 110.

When converting the analog continuous time signal into a discrete time signal, a quantization error occurs between the two signals. For example, for 128 samples, which is normally used in a radar, the quantization error is about one degree. That is, since 360 degrees/128 samples is about 2.8 degrees, with a phase deviation of about 2.8 degrees, a certain phase component shifts to an adjacent phase component. The resulting error is as small as about 1.4 degrees at the maximum. The present inventors have assumed that such a small error does not affect the accuracy of the radar device 100 if a phase component is extracted in the following manner.

The calculation circuit 110 performs discrete Fourier transform on the discrete time beat signal. In the embodiment, as discrete Fourier transform, fast Fourier transform is performed. The FFT 114 of the calculation circuit 110 performs fast Fourier transform on the discrete time beat signal. Fast Fourier transform is known processing expressed by the following equation (2):

$$x_k = \sum_{n=0}^{N-1} x_n \cdot W_N^{nk}, \quad W_N^{nk} = e^{-j\frac{2\pi}{N}(nk)} \quad (2)$$

where $X_n$ is frequency domain data, and $x_n$ is time domain data representing the discrete time beat signal.

The FFT 114 generates the frequency domain data $X_n$ according to equation (2). With the number N of samples and the sampling frequency fs, the frequency f[n] of the n-th (n is an integer of 0 to N−1) element of an FFT array can be found by the following equation (3).

$$f[n] = fs \cdot n/N \quad (3)$$

As discussed above, the frequency of a beat signal is a value determined by the distance from the radar device 100 to a reflection point. Attention is now focused on the reflection point R1 on the inner surface of the radar dome 152, which is the closest point from the radar device 100, as shown in FIG. 5. The frequency of the beat signal generated from the reflected wave at the reflection point R1 is the lowest frequency corresponding to n=1, except for the frequency f[0], which is a DC component, and can be obtained as f[1]=fs/N.

The extractor 116 extracts frequency data $X_1$ by using the following equation (4).

$$X_1 = \sum_{n=0}^{N-1} x_n \cdot W_N^n, \quad W_N^n = e^{-j\frac{2\pi}{N}n} \quad (4)$$

Equation (4) can also be expressed by equation (5).

$$X_1 = x_0 \cdot e^{-j0} + x_1 \cdot e^{j\frac{2\pi}{N}} + x_2 \cdot e^{j\frac{2\pi}{N}2} + x_3 \cdot e^{j\frac{2\pi}{N}3} + \cdots + x_{N-1} \cdot e^{j\frac{2\pi}{N}(N-1)} \quad (5)$$

Equation (5) can be reduced into equation (6).

$$X_1 = A_{near} \cdot e^{j\theta_{near}} \quad (6)$$

Equation (6) represents a component of the phase $\theta_{near}$ corresponding to the frequency component f[1] of the discrete time beat signal. The extractor 116 extracts $X_1$ found from equation (6) as the phase component corresponding to the frequency component f[1].

The reference data stored in the memory 106 will be explained below.

The reference data indicates a phase component corresponding to the frequency component f[1] generated by performing the above-described processing on a beat signal obtained when there is no abnormality concerning the radar device 100. "There is no abnormality concerning the radar device 100" means that the radar dome 152 storing the radar device 100 is free from any substance attached to the radar dome 152 or scratch on the radar dome 152. Typically, no abnormality is found for a radar device 100 before shipping. A beat signal is generated by using such a radar device 100. Then, the calculation circuit 110 converts the beat signal into a discrete time beat signal and performs fast Fourier transform on the discrete time beat signal. The calculation circuit 110 then extracts the frequency data $X_1$ about the frequency f[1] of the beat signal generated from the reflected wave at the reflection point R1. As a result, as in equation (6), frequency data $X_{base}$ expressed by equation (7) is found from equation (4) or (5).

$$X_{base} = A_{base} \cdot e^{j\theta_{base}} \quad (7)$$

The frequency data $X_{base}$, which is the phase component corresponding to the frequency component f[1], found from equation (7) is stored in the memory 106 as the reference data when the radar device 100 is shipped.

Processing using the phase component found in equation (6) and the reference data will now be discussed.

The difference calculator 118 calculates the difference $X_{test}$ between the phase component found from equation (6) and the reference data, and more specifically, calculates the following equation (8).

$$X_{test} = X_1 - X_{base} = A_{test} \cdot e^{j\theta_{base}} \quad (8)$$

The comparator 120 compares the complex amplitude $A_{test}$ and the threshold T and determines, based on the comparison result, the presence or absence of an abnormality concerning the radar device 100 by using the following expressions (9).

When $A_{test} > T$, there is an abnormality, and

When $A_{test} \geq T$, there is no abnormality. (9)

This will be explained by taking a specific example.

According to Euler's formula, the right side ($A_{test} \cdot e^{j\theta_{base}}$) of equation (8) can be divided into a real part represented by the phase $\theta_{base}$ and an imaginary part. The right side of each of equations (6) and (7) can also be divided into a real part and an imaginary part. Attention will now be focused on the real part.

Figure 7A:
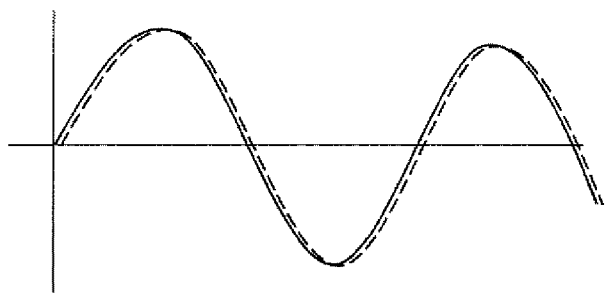
FIG. 7A is a waveform diagram illustrating a waveform (solid line) of the real part of a phase component $X_{base}$ stored as reference data and a waveform (broken line) of the real part of a phase component $X_1$ extracted from a beat signal obtained when there is no abnormality in the radar dome.

FIG. 7A illustrates a waveform (solid line) of the real part of the phase component $X_{base}$ stored in the memory 106 as the reference data and a waveform (broken line) of the real part of the phase component $X_1$ extracted from a beat signal which is obtained when there is no abnormality in the radar dome 152. The complex amplitudes of the two phase components substantially match each other, and the two phase components are also substantially in phase with each other. The difference between the real parts of the two phase components is calculated to be almost 0.

Figure 7B:
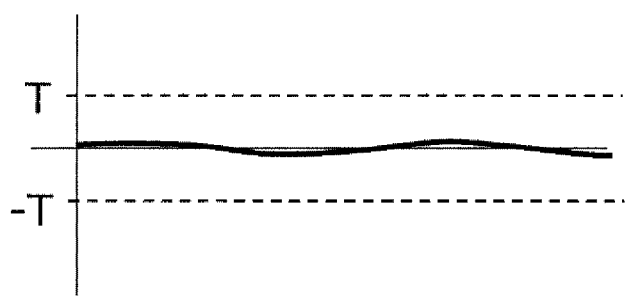
FIG. 7B is a waveform diagram illustrating the real part of a difference $X_{test}$.

FIG. 7B illustrates a waveform of the real part of the difference $X_{test}$ expressed by equation (8). It can be seen from FIG. 7B that the amplitude of the waveform is very small. The threshold T to be compared with the complex amplitude $A_{test}$ is also shown in FIG. 7B. In the example in FIG. 7B, $A_{test}$T in expressions (9) holds true over the entire waveform. The comparator 120 (see FIG. 2) thus judges that there is no abnormality.

Figure 8A:
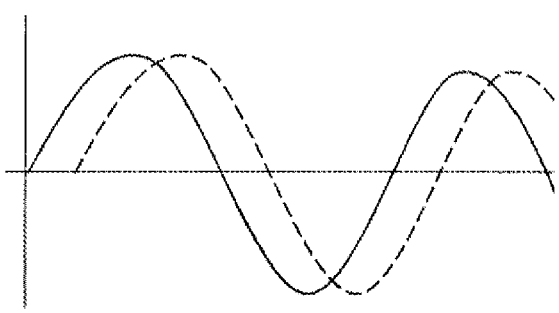
FIG. 8A is a waveform diagram illustrating a waveform (solid line) of the real part of the phase component $X_{base}$ stored as the reference data and a waveform (broken line) of the real part of a phase component $X_1$ extracted from a beat signal obtained when there is an abnormality in the radar dome.

FIG. 8A illustrates a waveform (solid line) of the real part of the phase component $X_{base}$ stored in the memory 106 as the reference data and a waveform (broken line) of the real part of the phase component $X_1$ extracted from a beat signal which is obtained when there is an abnormality in the radar dome 152. The complex amplitude of the phase component $X_1$ significantly deviates from that of the phase component $X_{base}$, and the phase component $X_1$ is also significantly out of phase with the phase component $X_{base}$. It can be assumed that the difference between the real parts of the two phase components is not calculated to be 0.

Figure 8B:
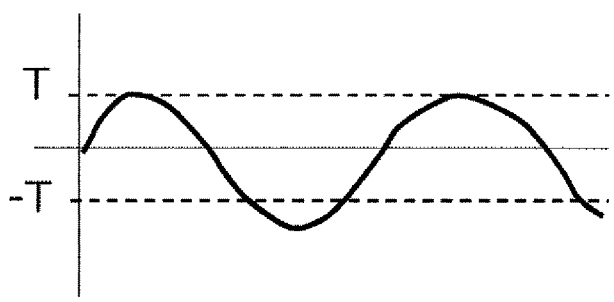
FIG. 8B is a waveform diagram illustrating the real part of a difference $X_{test}$.

FIG. 8B illustrates a waveform of the real part of the difference $X_{test}$ expressed by equation (8). The threshold T to be compared with the complex amplitude $A_{test}$ is also shown in FIG. 8B. In the example in FIG. 8B, $A_{test}$T in expressions (9) does not always hold true over the entire waveform, and instead, $A_{test} > T$ holds true in part of the waveform. The comparator 120 thus judges that there is an abnormality.

When the comparator 120 has judged that there is an abnormality concerning the radar device 100, the notifying processor 122 notifies the user of the radar device 100 that an abnormality has occurred in the radar device 100. The notifying processor 122 can supply this information to the user in various manners. For example, the notifying processor 122 may process preset sound data and output alarm sound from an in-vehicle speaker (not shown) or process preset image data and display an alarm image on an in-vehicle display (not shown). The notifying processor 122 may vibrate a vibrator (not shown) built in the steering wheel of the vehicle based on a preset vibration pattern. The notifying processor 122 may issue an alarm to the user by combining some of the above-described measures.

After being informed of the presence of an abnormality concerning the radar device 100, if the user has found a substance adhering to the bumper of the vehicle, the user can remove it, or if the user has found a scratch on the bumper, the user can have it repaired. As a result, the detection accuracy of the radar device 100 can be maintained.

All or some of the FFT 114, the extractor 116, the difference calculator 118, the comparator 120, and the notifying processor 122 may be formed as a hardware circuit within the calculation circuit 110 or may be implemented as a result of the calculation circuit 110 executing a software program describing instruction sets for executing the individual processing operations.

In the example in FIGS. 7A and 7B, the complex amplitude and the phase of the phase component $X_{base}$ of the reference data and those of the phase component $X_1$ extracted from the actually generated beat signal substantially match each other. This is only an example for the sake of description, and it is possible that the complex amplitude of the two phase components $X_{base}$ and $X_1$ be different from each other. For example, the complex amplitude of the phase component $X_1$ may become greater than that of the phase component $X_{base}$. In this case, the comparator 120 simply makes a judgement based on the above-described expressions (9). If the complex amplitude of the phase component $X_1$ extracted from the actually generated beat signal is significantly different from that of the phase component $X_{base}$ of the reference data, it can be assumed that there is an abnormality.

In this embodiment, as processing for determining the presence or absence of an abnormality, processing using the frequency component f[1] corresponding to the distance from the radar device 100 to the reflection point R1, which is the closest point from the radar device 100, has been discussed by way of example. However, the distance to the reflection point may not necessarily be fixed. As shown in FIG. 5, there can be numerous reflection paths inside the housing 150. One of the multiple reflection paths may be selected, and processing using a frequency component corresponding to the length of the selected reflection path may be executed.

In this manner, the length of the propagation path may not necessarily be fixed. The presence or absence of an abnormality may be judged as follows, for example. For frequency components f[k] corresponding to the lengths of various propagation paths k, phase components are determined as described above, and the phase component having the largest complex amplitude is selected. The difference between the largest complex amplitude of the selected phase component and the reference data is compared with the threshold T. Normally, it is difficult to specify at which position of the housing 150 an abnormality, such as a substance or a scratch, occurs. Hence, the frequency components corresponding to the lengths of various propagation paths are first found, and the phase components corresponding to the frequency components are determined. Then, by using the phase component which is most likely to be affected by the presence of an abnormality, such as a substance or a scratch, the presence or absence of an abnormality is judged. This makes it possible to more flexibly judge the presence or absence of an abnormality wherever an abnormality has occurred.

In abnormality judging processing executed in the embodiment, a phase component is found from a frequency component corresponding to a set distance, and the difference between the complex amplitude of the phase component and the preset reference data is compared with the threshold, thereby judging the presence or absence of an abnormality. This makes it possible to find an abnormality, such as a substance or a scratch, on the housing 150 or the bumper of a vehicle, which is difficult to find by a known method. As a result, the medium-distance measurement accuracy of the radar device 100 can be maintained.

Figure 9:
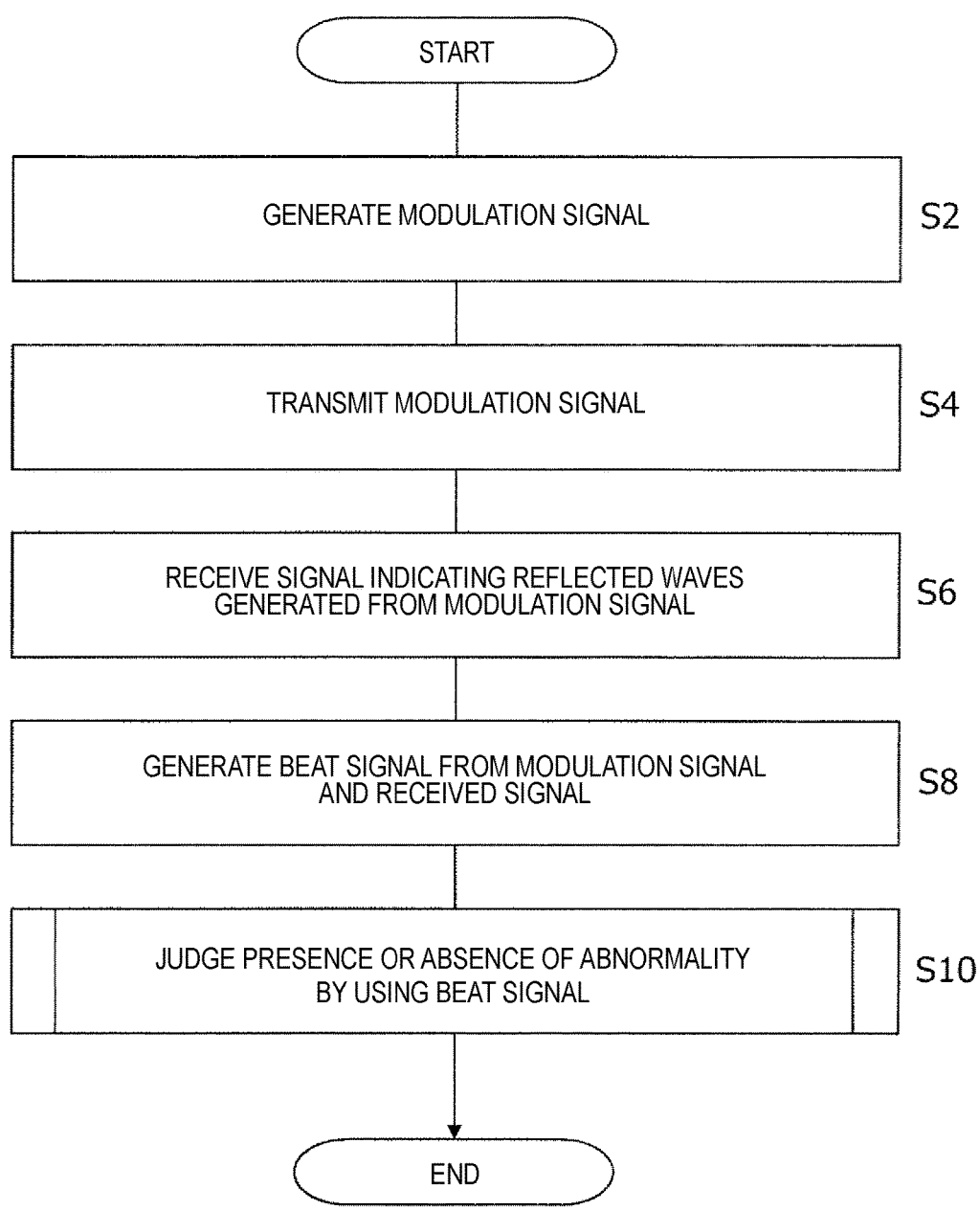
FIG. 9 is a flowchart illustrating a procedure for abnormality judging processing executed by the radar device.

FIG. 9 is a flowchart illustrating a procedure for abnormality judging processing executed by the radar device 100. In the embodiment, it is assumed that the operation of the radar device 100 is controlled by the calculation circuit 110. Alternatively, a control circuit, which is not shown, may control the operation of the radar device 100 by supplying a control signal to elements of the radar device 100, such as the transmitter 102 and the calculation circuit 110.

In step S2, the calculation circuit 110 causes the transmitter 102 to generate a modulation signal (see FIGS. 3A through 4B). In step S4, the calculation circuit 110 supplies power to the transmit antenna Tx to cause it to send the modulation signal. In step S6, the calculation circuit 110 supplies power to the receive antenna Rx to cause it to receive a signal indicating reflected waves generated from the modulation signal. As described above, the received signal indicates waves generated as a result of the modulation signal being reflected on the inner side and inside the radar dome 152 and having reached the receive antenna Rx and waves generated as a result of the modulation signal being radiated to the outside of the radar dome 152 and being reflected by the surface of a target and having reached the receive antenna Rx.

In step S8, the calculation circuit 110 causes the mixer 108 to generate a beat signal from the modulation signal and the received signal. In step S10, the calculation circuit 110 judges the presence or absence of an abnormality by using the beat signal.

Figure 10:
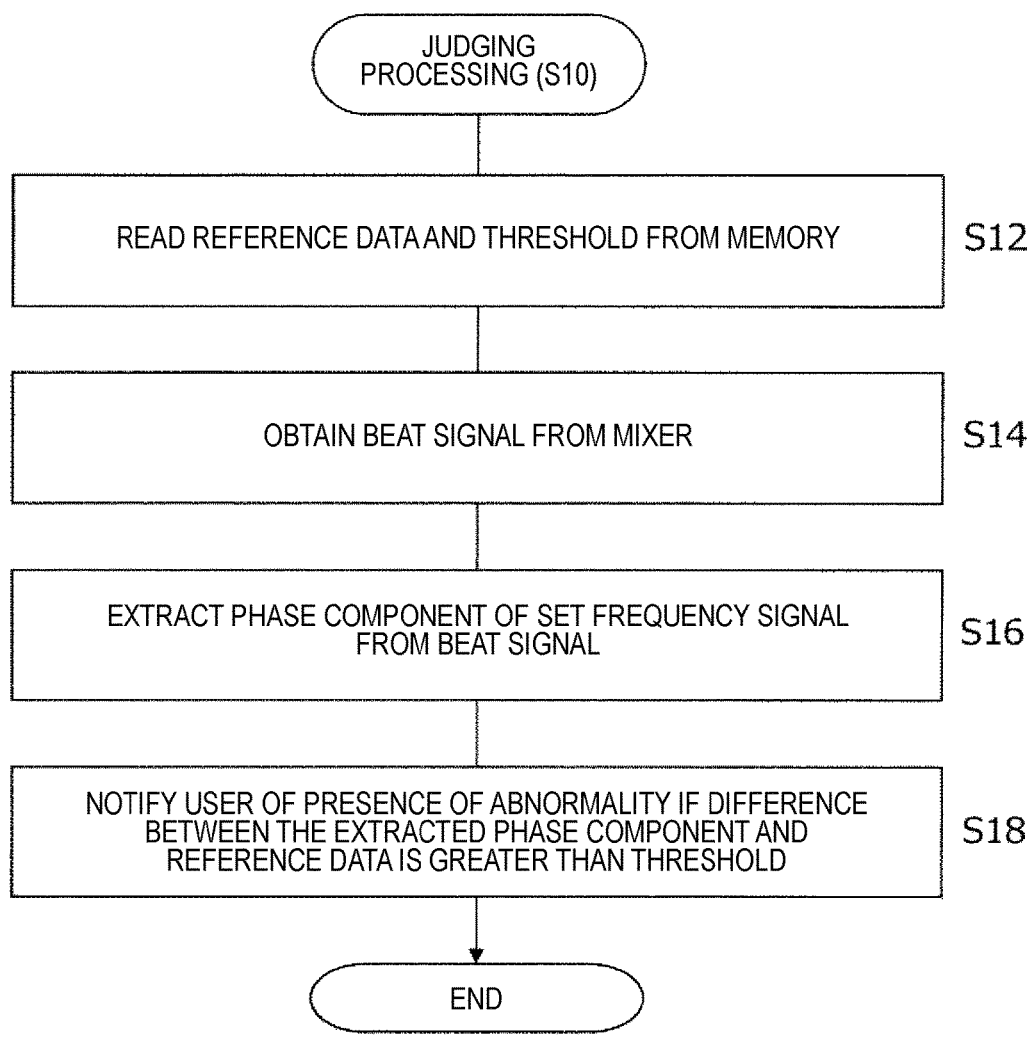
FIG. 10 is a flowchart illustrating the details of step S10 in FIG. 9.

FIG. 10 is a flowchart illustrating the details of step S10 in FIG. 9. A description will be given, assuming that the elements forming the calculation circuit 110 shown in FIG. 2 executes step S10.

In step S12, as a pre-step before executing judging processing, the difference calculator 118 reads the reference data and the threshold from the memory 106 and stores them in the internal register of the calculation circuit 110, for example.

In step S14, the ADC 112 obtains a beat signal from the mixer 108. The FFT 114 then executes fast Fourier transform on the beat signal. In step S16, the extractor 116 extracts a phase component of a set frequency signal from the beat signal. In step S18, the comparator 120 compares the difference between the extracted phase component and the reference data with the threshold, and if the difference is found to be greater than the threshold, the notifying processor 122 notifies the user of the presence of an abnormality.

As a result of executing the above-described processing, the radar device 100 is able to detect an abnormality, such as that in the bumper.

If the comparator 120 has judged that there is no abnormality, the estimation processor 124 estimates the distance to a detected target and the relative velocity and the orientation of the target.

Figure 11:
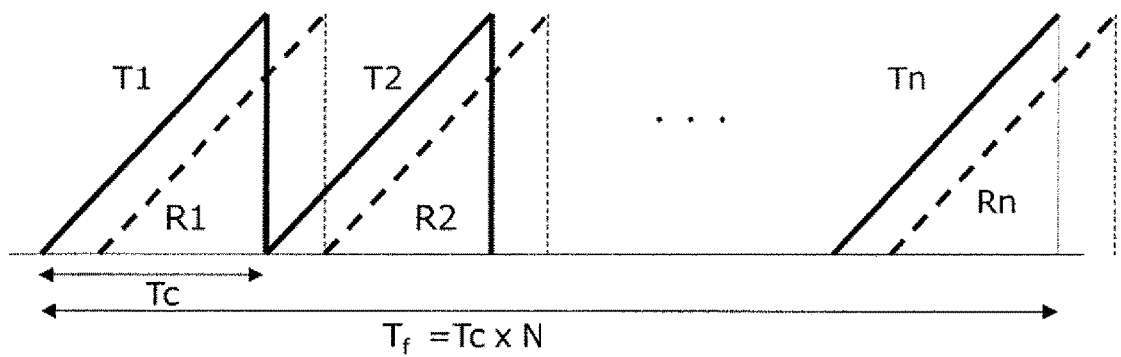
FIG. 11 is a waveform diagram illustrating a generalized relationship between transmitted chirp signals and received chirp signals for calculating the distance to a target and the relative velocity of the target.

To calculate the relative velocity of a target, it is suitable to transmit multiple chirp signals and to receive the corresponding chirp signals. For example, it is suitable to send and receive the chirp signals C1 through C3 shown in FIG. 4A or 4B. FIG. 11 illustrates a more generalized relationship between transmitted chirp signals and received chirp signals for calculating the distance to a target and the relative velocity of the target. It is now assumed that N chirp signals each having a continuous time Tc are continuously transmitted. A set of the N chirp signals will be called a frame. The frame period Tf is represented by Tf=Tc·N.

Two chirp signals that are continuously transmitted will be called chirp signals T1 and T2. In FIG. 11, the first two chirp signals are chirp signals T1 and T2. In the specification, two chirp signals that are continuously transmitted are called first and second chirp signals.

The estimation processor 124 calculates the relative velocity of one target or each of multiple targets by using the processing result of the FFT 114.

A first beat signal is obtained from the first chirp signal and the corresponding received signal, while a second beat signal is obtained from the second chirp signal and the corresponding received signal. The estimation processor 124 determines the relative velocity va according to the following equation (10):

$$va = \lambda \cdot \Delta\theta / (4\pi \cdot Tc) \quad (10)$$

where λ is the wavelength of the first and second beat signals, Δθ is the phase difference between the first and second beat signals, and v is the relative velocity of a target by which the first and second chirp signals are reflected.

The estimation processor 124 estimates the distance to one target or each of multiple targets by using the processing result of the FFT 114. A reflected wave returned from a certain target is now focused. For example, a beat signal includes a difference signal indicating the difference between the chirp signal transmitted through the transmission line TL2 and the received chirp signal indicating the reflected wave from the target. Considering that the chirp signal goes to the target and returns therefrom, the following equation (11) holds true:

$$2 \cdot d1 = c \cdot (\Delta f/f0) \quad (11)$$

where f0 is the slope of a change in the waveform of the chirp signal in the time-frequency domain, Δf is the frequency of the above-described difference signal, d1 is the distance to the target, and c is the speed of light. The slope f0, the frequency Δf, and the speed of light c are known.

The estimation processor 124 determines the distance d1 according to the following equation (12).

$$d1 = c/2 \cdot (\Delta f/f0) \quad (12)$$

Alternatively, the estimation processor 124 may determine the distance d1 according to the following equation (13) using the phase difference Δϕ between the transmitted chirp signal and the received chirp signal.

$$d1 = c/2 \cdot (\Delta t - \Delta \phi / 2\phi) \quad (13)$$

The estimation processor 124 estimates the orientation of a target based on the arrival direction of a received signal. To estimate the arrival direction of the received signal, the receive antenna Rx has plural receiving elements disposed at predetermined intervals in the form of an array. Based on the received signal obtained by each of the receiving elements, the estimation processor 124 estimates the number and the angles of incident waves by utilizing a super resolution algorithm, such as multiple signal classification (MUSIC), estimation of signal parameters via rotational invariance techniques (ESPRIT), and space-alternating generalized expectation-maximization (SAGE). This makes it possible to determine the number and the angles of leading vehicles. The above-described super resolution algorithms used for estimating the arrival direction are known and an explanation thereof will thus be omitted.

Figure 12:
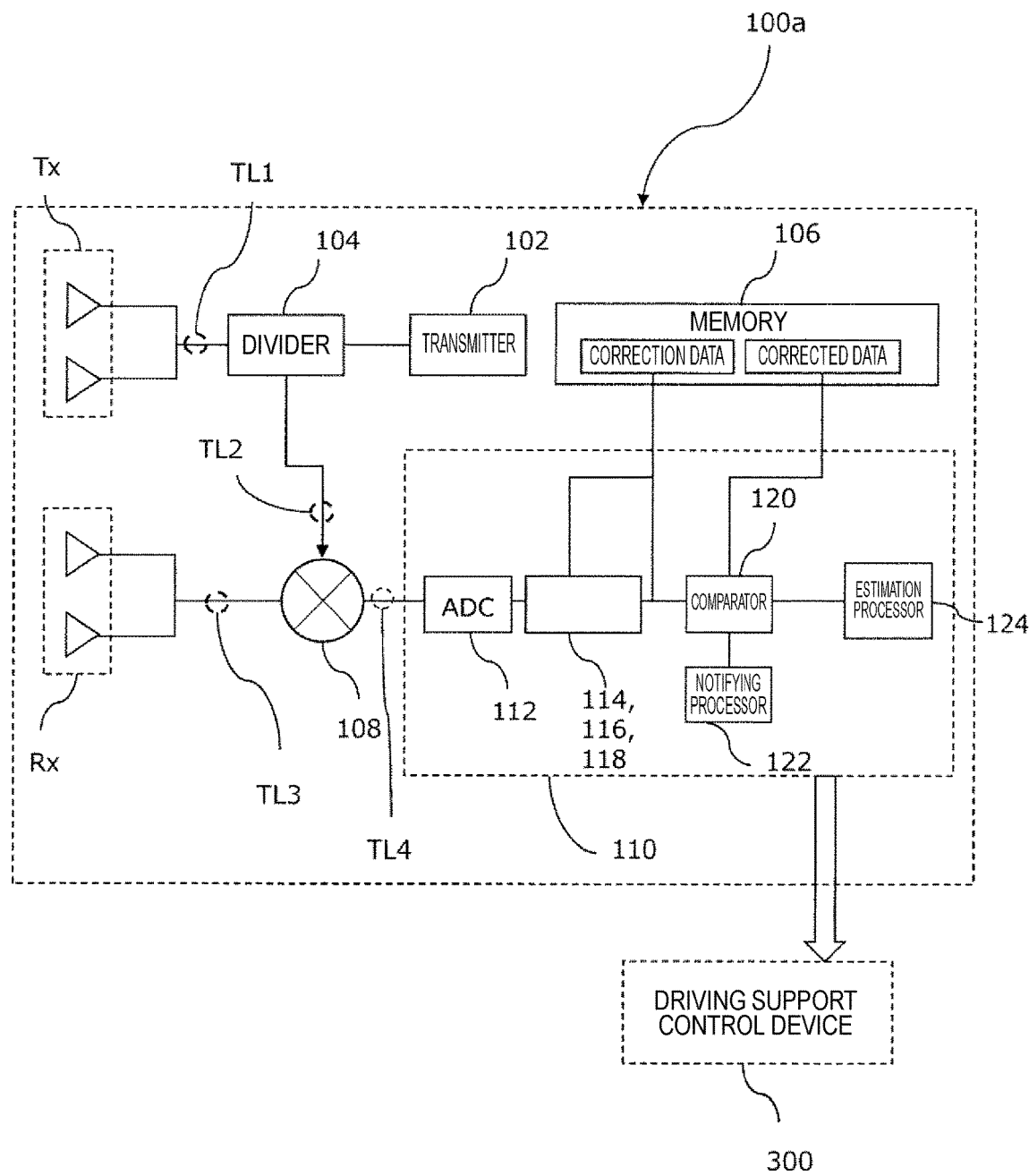
FIG. 12 is a block diagram illustrating the hardware configuration of a radar device according to a modified example of the embodiment.

FIG. 12 is a block diagram illustrating the hardware configuration of a radar device 100a according to a modified example of the embodiment. The element having the same hardware and/or the same function as the element shown in FIG. 2 is designated by like reference numeral and an explanation thereof is omitted. Although, for the sake of description, the FFT 114, the extractor 116, and the difference calculator 118 are integrated into one block in FIG. 12, they may be separately provided, as shown in FIG. 2. The radar dome 152 is provided in the radar device 100a, though it is not shown in FIG. 12.

The radar device 100a is different from the radar device 100 shown in FIG. 2 in that it stores correction data and corrected data in the memory 106. The reference data and the threshold used in the above-described embodiment are also stored in the memory 106.

The correction data indicates a calculation formula for correcting a phase shift caused by the temperature of the radar device 100a. A phase shift caused by the temperature of the radar device 100a is as follows. A beat signal, which indicates the measurement result, is influenced by the operating temperature of the radar device 100a. Hence, the phase component of the set frequency signal subjected to FFT processing is changed. It is known how much the phase component subjected to FFT processing is influenced by the temperature. To cancel the influence of the temperature on the phase component, the correction data is prepared. The correction data is applied to one of the FFT 114, the extractor 116, and the difference calculator 118. The calculation circuit 110 of the radar device 100a may obtain temperature data from an external source or from a built-in thermometer, which is not shown. The temperature data indicates the temperature of the radar device 100a at the time when a beat signal is generated.

The corrected data stored in the memory 106 indicates the absolute value of the reflection level of a signal reflected at a predetermined position at or near the radar dome 152. The reflection level indicated by the corrected data is the corrected level of reflection and is set to be a predetermined reflection level. The difference calculator 118 determines the difference between the reference data stored in the memory 106 and the complex amplitude of the phase component found from the frequency component corresponding to the distance to the predetermined position. The comparator 120 then compares this difference with the threshold. The comparator 120 also judges whether the phase component obtained by subtracting a phase amount indicated by the correction data from the extracted phase component exceeds the predetermined reflection level. If the phase component does not exceed the predetermined reflection level, the estimation processor 124 estimates the distance to a target and the relative velocity and the angle of the target.

As a result of executing the above-described processing, the radar device 100a is able to cancel a phase shift caused by the temperature of the radar device 100a and to judge the presence or absence of an abnormality, such as a substance or a scratch on the housing 150, while maintaining the detection accuracy.

In the above-described embodiment, the phase component has an amplitude value, and the presence or absence of an abnormality is judged based on whether the difference, which is the amplitude value, between the phase component and the reference data exceeds the threshold. Alternatively, the amplitude may not necessarily be used to determine the presence of an abnormality. For example, the threshold is set to be 30 degrees, and only a phase difference between the phase component and the reference data is checked. More specifically, if the phase difference is found to exceed the threshold, the presence of an abnormality is determined.

The radar device according to an embodiment of the disclosure can suitably be used in an in-vehicle radar system, various monitoring systems, an indoor positioning system, and a wireless communication system.

While embodiments of the disclosure have been described above, it is to be understood that variations and modifications will be apparent to those skilled in the art without necessarily departing from the scope and spirit of the disclosure. The scope of the disclosure, therefore, is to be determined solely by the following claims.

What is claimed is:

1. A radar device that is configured to detect an abnormality, comprising:
   a transmitter configured to generate a modulation signal;
   a transmit antenna configured to radiate the modulation signal;

a receive antenna configured to receive waves generated by reflection of the modulation signal, as a received signal;
a mixer that is connected to the transmit antenna and to the receive antenna, and that is configured to mix the modulation signal and the received signal so as to output a beat signal;
a calculation circuit configured to determine a presence or absence of an abnormality based on the beat signal, reference data, and a threshold; and
a memory configured to store the reference data, correction data, and the threshold, wherein:
the reference data comprises information of a phase component of a set frequency signal, the phase component being a phase component of a beat signal when there is no abnormality concerning the radar device,
the correction data is for correcting a change in a phase component of the set frequency signal caused by a temperature of the radar device
the set frequency signal is a signal generated as a result of the modulation signal radiated from the transmit antenna and reflected on a surface of a housing, the housing storing the radar device therein, the surface of the housing being a set distance from the radar device, and
the calculation circuit is configured to determine the presence or absence of the abnormality by:
reading the reference data and the threshold from the memory,
obtaining the beat signal from the mixer,
obtaining temperature data when the beat signal is obtained,
extracting a phase component of the set frequency signal from the beat signal,
correcting the extracted phase component based on the correction data and the temperature data after the phase component is extracted, and
supplying information indicating the presence of the abnormality when a difference between the corrected phase component and the phase component of the reference data is greater than the threshold.

2. The radar device according to claim 1, wherein:
the beat signal comprises frequency components, each of the frequency components corresponding to a distance by which the modulation signal radiated from the transmit antenna is reflected and returns to the receive antenna via a corresponding one of a plurality of reflection points, the plurality of reflection points comprising a point at which the modulation signal is reflected inside the housing and a point at which the modulation signal is reflected outside the housing;
there are a plurality of paths inside the housing, each of the plurality of paths being a path through which the modulation signal radiated from the transmit antenna is reflected back to the receive antenna; and
the set frequency signal comprises a frequency component corresponding to the distance of one of the plurality of paths.

3. The radar device according to claim 2, wherein when a difference between an amplitude value of the extracted phase component and an amplitude value of the phase component of the reference data is greater than the threshold, the calculation circuit is configured to supply the information indicating the presence of the abnormality.

4. The radar device according to claim 3, wherein:
the calculation circuit is configured to extract the phase component of the lowest frequency component; and
the lowest frequency component corresponds to the shortest path of the plurality of paths.

5. The radar device according to claim 3, wherein:
the calculation circuit is configured to extract a plurality of phase components, each of the plurality of phase components corresponding to one of the plurality of paths, and is configured to select the extracted phase component having the largest amplitude value; and
when the difference between the amplitude value of the selected phase component and an amplitude value of the phase component of the reference data is greater than the threshold, the calculation circuit is configured to supply the information indicating the presence of the abnormality.

6. The radar device according to claim 1, wherein:
the calculation circuit is configured to obtain the beat signal as a continuous time signal; and
the calculation circuit is configured to extract the phase component by:
sampling and quantizing the beat signal so as to generate a discrete time beat signal,
performing a discrete Fourier transform on the discrete time beat signal so as to transform the discrete time beat signal into frequency domain data, and
extracting the phase component of the set frequency signal from the frequency domain data, the phase component having an amplitude value.

7. The radar device according to claim 6, wherein:
the difference between the corrected phase component and the phase component of the reference data is represented by an amplitude value and a phase in a complex domain; and
when the amplitude value of the real part of the difference in the complex domain is greater than the threshold, the calculation circuit is configured to supply the information indicating the presence of the abnormality.

8. The radar device according to claim 1, wherein the modulation signal is a chirp signal or a modulated pulse signal.

9. The radar device according to claim 1, wherein:
the housing comprises at least a radar dome; and
the surface of the housing is a surface of the radar dome.

10. The radar device according to claim 1, wherein:
the calculation circuit is further configured to obtain the corrected phase component by subtracting a phase amount according to the correction data from the extracted phase component, and
when a level of the corrected phase component does not exceed a predetermined reflection level, the calculation circuit is further configured to perform measurement of a target.

* * * * *

UNITED STATES PATENT AND TRADEMARK OFFICE
CERTIFICATE OF CORRECTION

PATENT NO. : 11,874,396 B2
APPLICATION NO. : 17/361610
DATED : January 16, 2024
INVENTOR(S) : Takuya Maekawa et al.

Page 1 of 1

It is certified that error appears in the above-identified patent and that said Letters Patent is hereby corrected as shown below:

In the Specification

Column 15, Line 31, "$d1 = c/2·(\Delta t-\Delta\phi/2\phi)$" should be -- $d1 = c/2·(\Delta t-\Delta\phi/2\pi)$ --.

Signed and Sealed this
Thirty-first Day of December, 2024

Derrick Brent
*Acting Director of the United States Patent and Trademark Office*